(12) United States Patent
Hoffman (10) Patent No.: US 8,823,551 B1
(45) Date of Patent: Sep. 2, 2014

(54) SYSTEM TO ALIGN A VEHICLE WITHIN A PARKING LOCATION USING THERMAL TARGETS

(71) Applicant: Delphi Technologies, Inc., Troy, MI (US)

(72) Inventor: Peter F. Hoffman, Avon, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/788,021

(22) Filed: Mar. 7, 2013

(51) Int. Cl.
G08G 1/14 (2006.01)
G08G 1/137 (2006.01)

(52) U.S. Cl.
CPC ..................................... *G08G 1/137* (2013.01)
USPC ........................................ 340/932.2; 340/988

(58) Field of Classification Search
USPC ............... 340/932.2, 988, 531, 995; 320/108, 320/109; 701/32.3
See application file for complete search history.

(56) References Cited

U.S. PATENT DOCUMENTS

| | | | |
|---|---|---|---|
| 5,406,395 | A | 4/1995 | Wilson et al. |
| 5,498,948 | A | 3/1996 | Bruni et al. |
| 6,720,921 | B2 | 4/2004 | Ripingill, Jr. et al. |
| 7,573,402 | B2 * | 8/2009 | Herbert et al. ............. 340/932.2 |
| 8,008,888 | B2 | 8/2011 | Oyobe et al. |
| 2002/0140576 | A1 | 10/2002 | Simon |
| 2005/0150074 | A1 | 7/2005 | Diehl et al. |
| 2007/0126395 | A1 | 6/2007 | Suchar |
| 2007/0131505 | A1 | 6/2007 | Kim |
| 2009/0115336 | A1 | 5/2009 | Wang |
| 2010/0117596 | A1 | 5/2010 | Cook et al. |
| 2010/0225766 | A1 | 9/2010 | Haigh et al. |
| 2011/0063131 | A1 | 3/2011 | Toledo et al. |
| 2011/0181240 | A1 | 7/2011 | Baarman et al. |
| 2011/0254503 | A1 | 10/2011 | Widmer et al. |
| 2012/0091959 | A1 | 4/2012 | Martin et al. |
| 2012/0095617 | A1 | 4/2012 | Martin |
| 2012/0112538 | A1 | 5/2012 | Kesler et al. |
| 2012/0112691 | A1 | 5/2012 | Kurs et al. |
| 2012/0200151 | A1 | 8/2012 | Obayashi et al. |
| 2012/0262002 | A1 | 10/2012 | Widmer et al. |
| 2013/0037339 | A1 | 2/2013 | Hickox |

FOREIGN PATENT DOCUMENTS

WO 2011116394 A1 9/2011

OTHER PUBLICATIONS

International Search Report dated Feb. 28, 2014.

* cited by examiner

*Primary Examiner* — Shirley Lu
(74) *Attorney, Agent, or Firm* — Robert J. Myers (57) ABSTRACT

A system to align a vehicle in a parking location includes a plurality of heat generating devices, such as infrared LEDs, arranged in a surface of the parking location to produce a distinctive thermal pattern. A multiple zone temperature sensor is mounted to view the heat generating devices and is configured to output thermal data for each of the zones. A controller is configured to receive the thermal data and determine a thermal map of the plurality of heat generating devices. A display provides a graphic indication of the thermal map and a thermal alignment target. The system may be used to align a vehicle having a capture resonator of a wireless power transfer system to a parking location having a source resonator of a wireless power transfer system.

14 Claims, 9 Drawing Sheets

SYSTEM TO ALIGN A VEHICLE WITHIN A PARKING LOCATION USING THERMAL TARGETS

TECHNICAL FIELD OF INVENTION

The invention generally relates to a system to align a vehicle within a parking location using thermal targets, and more particularly relates to a system to align a source resonator to a capture resonator of a wireless electrical power transfer system using a multiple zone temperature sensor to detect a thermal target pattern proximate to the source resonator.

BACKGROUND OF INVENTION

Electric vehicles and electric-hybrid vehicles are gaining in popularity with consumers. The electric motors in these vehicles are typically powered from multiple storage batteries disposed in a battery pack in the vehicle. If the battery needs to be recharged while the vehicle is parked, a wired coupling device is connected to the vehicle, typically by the vehicle operator. However, some operators object to having to 'plug-in' their vehicle each time the vehicle is parked.

Wireless or connector less battery chargers have been proposed, see U.S. Pat. No. 5,498,948 issued Mar. 12, 1996 to Bruni et al. and U.S. Pat. No. 8,008,888 issued Aug. 30, 2011 to Oyobe et al. A known wireless battery charger includes a source resonator or charging pad lying on a parking surface under the vehicle being charged, and a corresponding capture resonator mounted underneath the vehicle. Such wireless battery chargers are most efficient when the vehicle is parked such that the source resonator and capture resonator are horizontally (i.e. laterally and longitudinally) aligned. However, as the source resonator and the capture resonator are underneath the vehicle and/or out of the vehicle operator's view, it is difficult for the vehicle operator to judge where to park the vehicle so that the source resonator and the capture resonator are aligned.

Some current wireless charging systems rely on methods to align the capture resonator attached to the undercarriage of a vehicle with its corresponding source resonator using trial and error positioning of the vehicle relative to the source resonator. These methods are time intensive, with poor repeatable results. Other wireless charging systems utilize wheel stops to align the capture resonator on the vehicle with the source resonator. While these systems may provide precise alignment for one particular vehicle configuration, they are unlikely to provide adequate alignment for a wide variety of vehicles wherein the spatial relationship between the wheels and capture resonator differ. Still other wireless charging systems provide a magnetic beacon signal to guide the vehicle to align the capture resonator with the source resonator. Examples of such systems are described in U.S. patent application Ser. No. 13/677,362 and U.S. patent application Ser. No. 13/677,369, both filed Nov. 15, 2012.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY OF THE INVENTION

In accordance with one embodiment of this invention, a system to align a vehicle in a parking location is provided. The system includes a plurality of heat generating devices arranged in a surface of the parking location to produce a distinctive thermal pattern and a multiple zone temperature sensor mounted so as to have a sensor field of view including the plurality of heat generating devices and configured to output thermal data indicative of a zone temperature for each of the zone. The system further includes a controller in communication with the multiple zone temperature sensor and a memory device storing instructions that, when executed, cause the controller to receive the thermal data from the multiple zone temperature sensor and determine a thermal map of the plurality of heat generating devices characterized by an array of thermal data cells. Each thermal data cell has a temperature value based on a temperature characteristic of one or more of the zones. The system also includes a display in communication with the controller. The display provides a graphic indication of the thermal map and a thermal alignment target.

The memory device may contain additional instructions that, when executed, cause the controller to compare the thermal map to a reference thermal map of the plurality of heat generating devices, determine a thermal vector required to align the thermal map to the reference thermal map, and provide an alignment signal based on the thermal vector that is indicative of a movement required to align the vehicle within the parking location. The display provides a graphic indication, based on the alignment signal, of the movement required by the vehicle to align the vehicle within the parking location.

The plurality of heat generating devices may be infrared (IR) light emitting diodes (LEDs) or resistive heating elements.

The plurality of heat generating devices may be disposed proximate to a source resonator of a wireless charging system.

The multiple zone temperature sensor may be mounted on an underside of the vehicle.

In accordance with another embodiment of this invention, the system further includes a source resonator coupled to an electrical current source that causes the source resonator to emit a magnetic charging signal and a capture resonator configured to wirelessly receive the magnetic charging signal and provide electrical current.

The multiple zone temperature sensor may be mounted so as to have the sensor field of view including the source resonator. The plurality of heat generating devices may be disposed proximate to the source resonator. The display may provide the graphic indication of the thermal map and the thermal alignment target such that the source resonator and the capture resonator are aligned when the thermal map of the plurality of heat generating devices and the thermal alignment target are overlaid on the display.

The source resonator may define a distinctive visual pattern. The system further may include a visible light camera in communication with the controller mounted so as to have a camera field of view that includes the source resonator and configured to output visible light image data indicative of visible light intensity detected by pixels in the visible light camera. The memory device may contain additional instructions that, when executed, cause the controller to receive visible light image data from the visible light camera and determine an visual map characterized by an array of intensity data cells, The display may provide a graphic indication of the visual map such that the source resonator and the capture resonator are aligned when a visual map of the distinctive visual pattern, the thermal map of the plurality of heat generating devices, and the thermal alignment target are overlaid on the display.

The visible light camera may be mounted proximate to the capture resonator.

The memory device may contain additional instructions that, when executed, cause the controller to compare the thermal map to a reference thermal map, determine a thermal vector required to align the thermal map to the reference thermal map, compare the visual map to a reference visual map, determine a visual vector required to align the visual map to the reference visual map, and provide an alignment signal based on the thermal vector and the visual vector and indicative of a movement required to align the source resonator and the capture resonator. The display provides a graphic indication of the movement required to align the capture resonator and the source resonator, based on the alignment signal.

The multiple zone temperature sensor may be disposed proximate to the capture resonator.

The memory device may contain additional instructions that, when executed, cause the controller to compare the thermal map to a reference thermal map of the plurality of heat generating devices, determine a thermal vector required to align the thermal map to the reference thermal map, and provide an alignment signal based on the thermal vector and indicative of a movement required to align the source resonator and the capture resonator.

The display may provide a graphic indication of the movement required by the vehicle to align the capture resonator and the source resonator, based on the alignment signal.

The multiple zone temperature sensor may be mounted so as to have the sensor field of view including the capture resonator. The plurality of heat generating devices may be disposed proximate to the capture resonator. The display may provide the graphic indication of the thermal map and the graphic indication of the thermal alignment target such that the source resonator and the capture resonator are aligned when the thermal map and the thermal alignment target are overlaid on the display.

The multiple zone temperature sensor may be disposed proximate to the source resonator.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Described herein is a system for aligning a vehicle in a parking location. The system may be advantageously used for aligning a vehicle having a capture resonator with a source resonator located in a parking location, such as those used in an electric vehicle charging system, in order to maximize the efficiency of electrical power transfer between the source resonator and the capture resonator. The source resonator emits a magnetic charging signal that is amplitude modulated at a resonant frequency of the source resonator and the capture resonator. The charging signal is transmitted to the capture resonator wherein the charging signal induces an electric current. The capture resonator is attached to a vehicle and the vehicle is maneuvered to align the source resonator and the capture resonator so that the source resonator and capture resonator are aligned for maximum power transfer efficiency when the vehicle is parked. Because the capture resonator is typically located on the underside of the vehicle out of the direct view of a vehicle operator, the system includes a sensor and a controller to align the vehicle within a parking location so that the capture resonator and source resonator are aligned for optimum power transfer. The distance and direction that the vehicle needs to move to align the vehicle within the parking location is displayed on a display device that is visible to the operator during the alignment.

Figure 1:
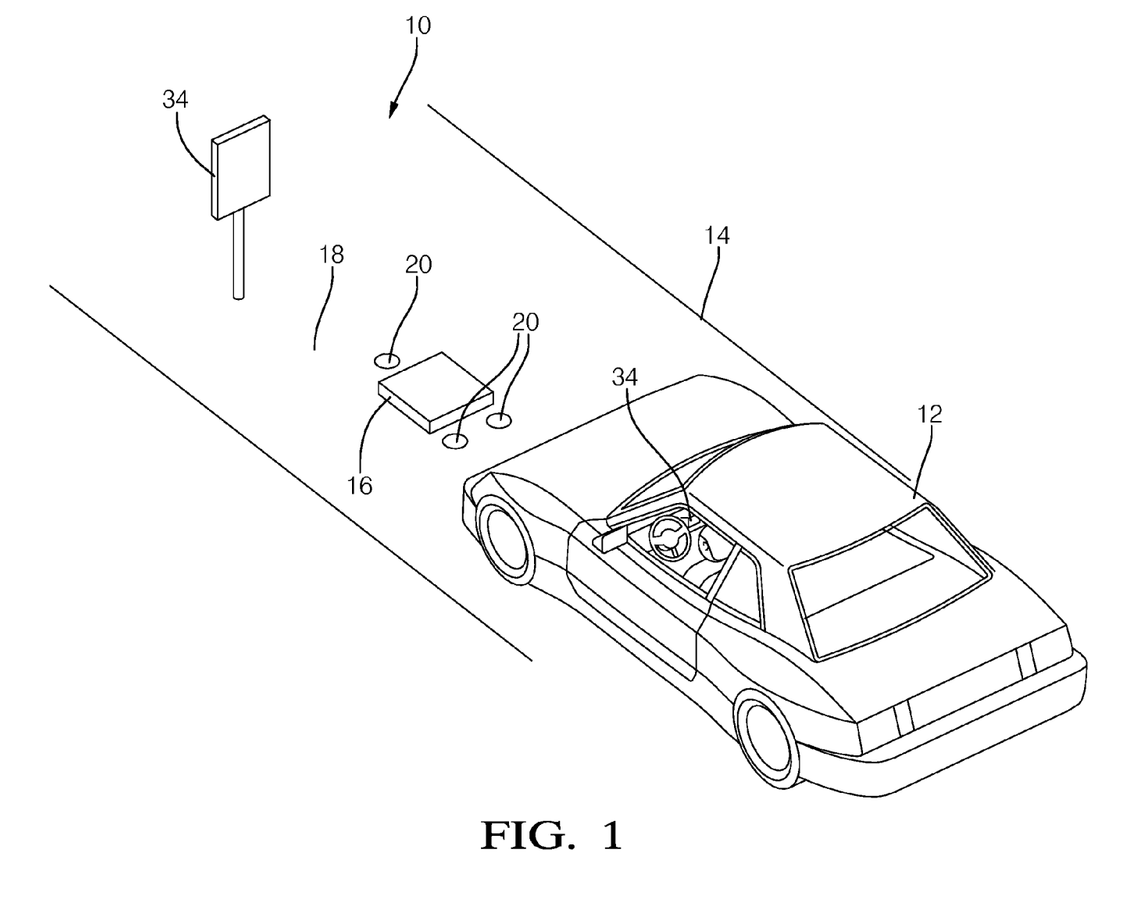
FIG. 1 is an overhead perspective view of a system for aligning a vehicle in a parking location in accordance with one embodiment.

FIG. 1 illustrates a non-limiting example of a system 10 to align a vehicle 12 having a capture resonator (not shown) in a parking location 14 having a source resonator 16 on the surface 18 of the parking location 14 or embedded into the surface 18 of the parking location 14. The system 10 includes a plurality of heat generating devices 20 arranged in the parking location 14 so as to produce a distinctive thermal pattern to define a thermal target. The heat generating devices 20 are laid out within the parking location 14 to form a distinctive pattern or geometric figure. The heat generating devices 20 may be located in the surface 18 of the parking location 14 proximate the source resonator 16 or the heat generating devices 20 may be integral to a housing containing the source resonator 16. The pattern preferably defines an irregular polygon, such as an isosceles triangle, so that there is a unique alignment between the vehicle 12 and the thermal pattern when the vehicle 12 is properly aligned within the parking location 14. The heat generating devices 20 are configured to produce areas within the parking location 14 that are at a higher temperature than the surrounding surface 18 of the parking location 14.

The plurality of heat generating devices 20 may be infrared (IR) light emitting diodes (LEDs), such as Model SFH4236 available from Osram Opto Semiconductors of Sunnyvale, Calif. The LEDs are configured to emit electromagnetic energy with a wavelength in the infrared (IR) spectrum (750 nanometers to 1000 nanometers). Alternatively, the plurality of heat generating devices 20 may be resistive heating elements, such as coil formed of nickel-chromium wire or incandescent light bulbs. The design and fabrication of resistive heating elements are well known to those skilled in the art.

Other embodiments of the invention may be envisioned in which the heat generating elements produce areas within the parking location 14 that have a lower temperature than the surrounding surface 18 of the parking location 14. This provides an advantage in a very hot parking location 14, for example a parking lot in Arizona on a sunny summer day. In this alternative embodiment, the heat generating device may be a thermoelectric device that can be configured to be hotter or colder than the parking surface 18, depending on the polarity of the electrical current supplied to the thermoelectric device.

Figure 2:
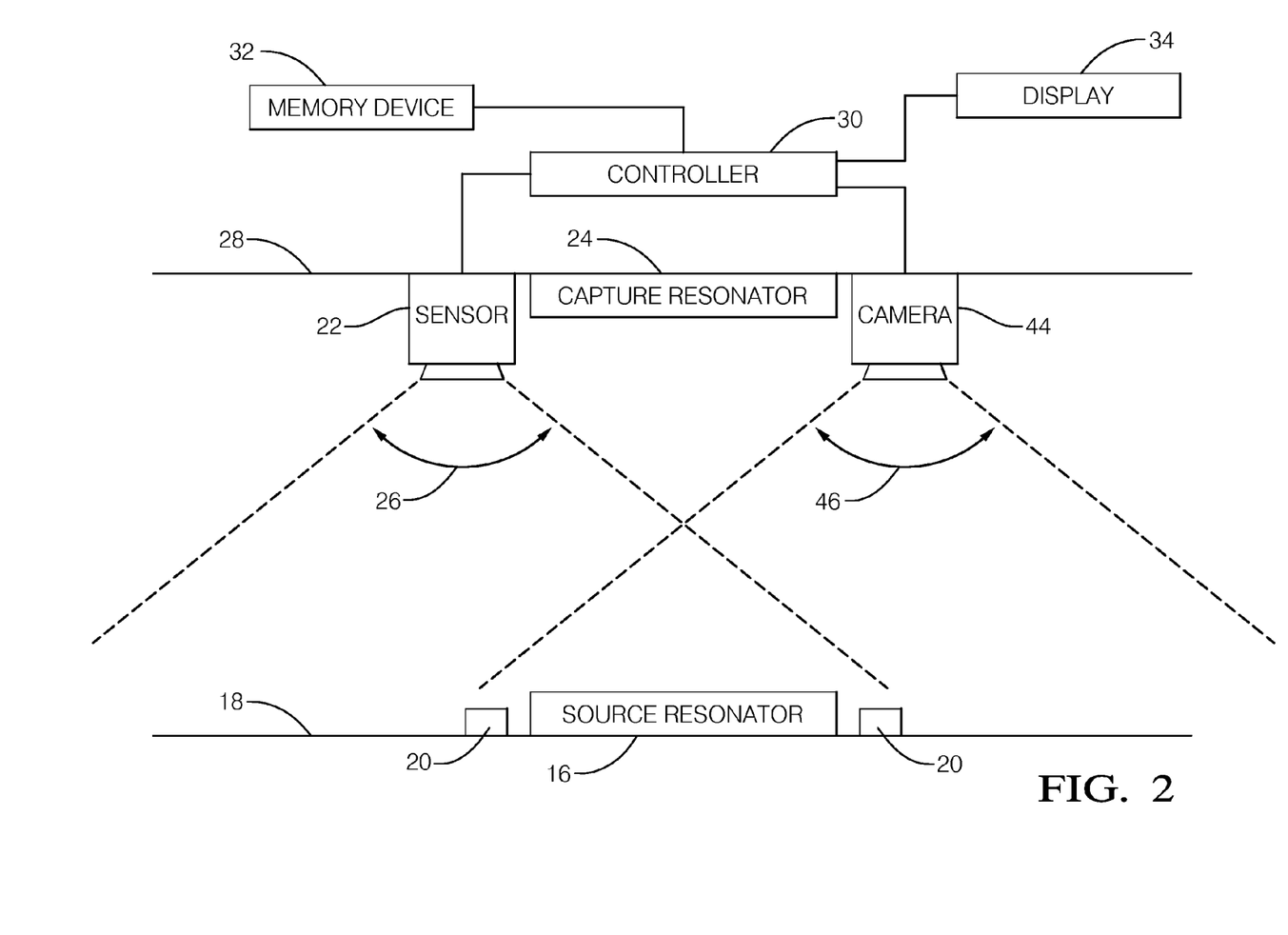
FIG. 2 is a system schematic diagram of a system for aligning a vehicle in a parking location in accordance with several embodiments.
Figure 3:
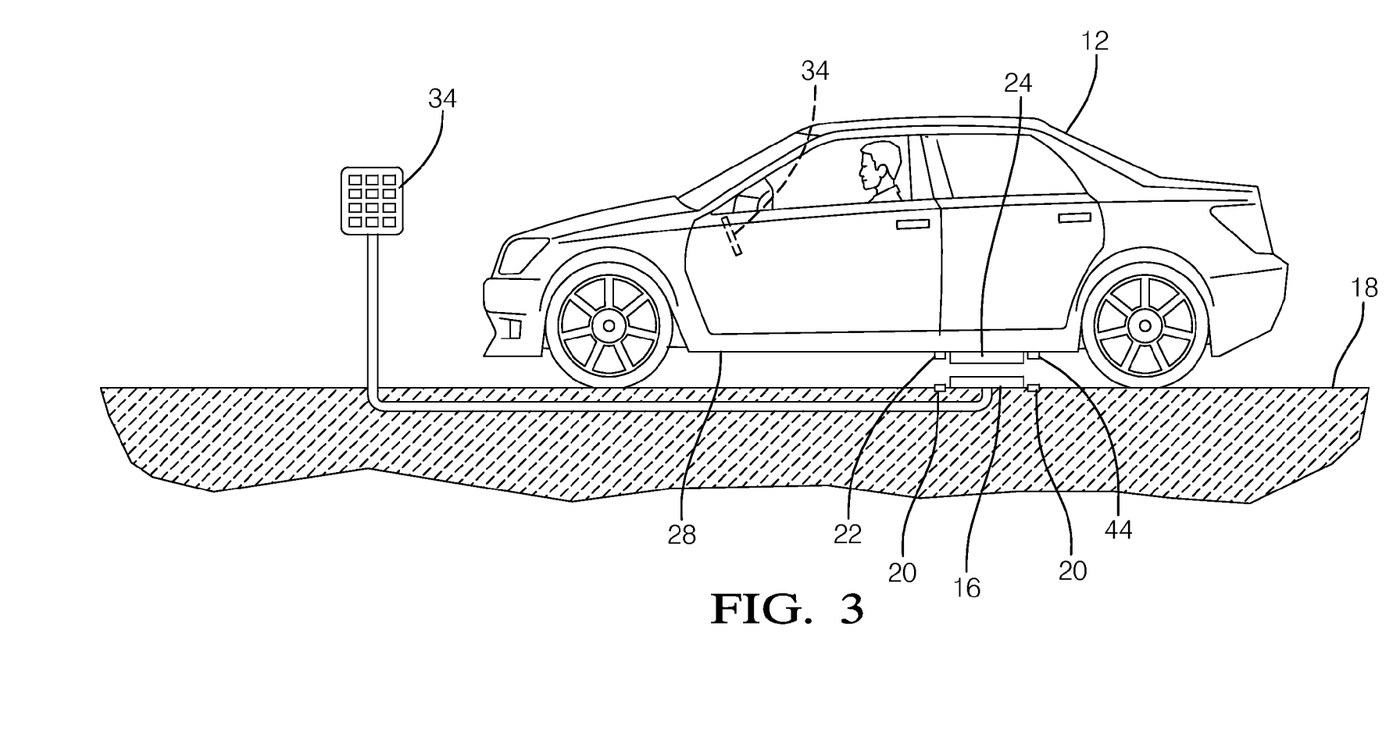
FIG. 3 is a side view of the system of a system for aligning a vehicle in a parking location in accordance with several embodiments.

As illustrated in FIG. 2, the system 10 further includes a multiple zone temperature sensor 22, hereafter referred to as the sensor 22, mounted proximate to the capture resonator 24 so as to have a sensor field of view 26 including the plurality of heat generating devices 20 and the source resonator 16 when the vehicle 12 is approaching the source resonator 16. As illustrated in FIG. 3, the capture resonator 24 and the sensor 22 are disposed on the underside 28 of the vehicle 12.

The sensor 22 is configured to output thermal data indicative of a zone temperature for each of the zones. As used herein, the sensor 22 is a device that is most sensitive to electromagnetic energy within the IR spectrum. The sensor 22 is generally configured to output thermal data indicative of a zone temperature for each individual zone of the multiple zones in a sensor field of view 26. The individual zones may each be relatively small regions that result in detection gaps between the individual zones, or the zones may be sized and shaped so most or all locations in the sensor field of view 26 are covered by one of the individual zones, or the zones may be sized and shaped so there is some overlap of the individual zones so some locations are covered by more than one of the individual zones. The sensor 22 may include an array having a plurality of thermopile sensors, such as those available from Heimann Sensor GmbH located in Dresden, Germany. A suitable resolution for the sensor 22 may be provided by a thermopile array of 32 by 31 thermopiles that are configured to view 992 distinct temperature zones in the sensor field of view 26. The multiple zone temperature sensor 22 alternatively includes an IR imaging camera that provides a higher resolution than the thermopile array sensor. Using a thermopile arrays sensor instead of an IR camera is preferred to keep the cost of the system 10 low, an important factor for automotive applications. The sensor 22 is mounted on an underside 28 of the vehicle 12 in order for the sensor field of view 26 to provide a view of the plurality of heat generating devices 20 in the parking location 14.

Referring once more to FIG. 2, the system 10 also includes a controller 30 in communication with the sensor 22. The controller 30 may include a processor (not shown) such as a microprocessor or other control circuitry as should be evident to those skilled in the art. The controller 30 also includes analog to digital convertor circuitry and digital to analog convertor circuitry (not shown) to be able to communicate with the multiple zone temperature sensor 22 and other sensors or circuitry (not shown) that is included in the system 10. The system 10 further includes a memory device 32 in communication with the controller 30, the memory device 32 having non-volatile memory, such as electrically erasable programmable read-only memory (EEPROM). The memory device 32 stores instructions that, when executed, cause the controller 30 to receive the thermal data from the sensor 22 and determine a thermal map of the plurality of heat generating devices 20 forming an array of thermal data cells. Each thermal data cell has a temperature value based on a temperature characteristic of one or more of the zones. The memory device 32 may also have volatile memory for storing intermediate calculations or captured data for sue by the controller 30. The one or more routines are executed by the processor to perform steps for determining the location of the capture resonator 24 on the vehicle 12 relative to the source resonator 16 in the parking location 14.

The system 10 additionally includes a display 34 in communication with the controller 30. The display 34 provides an indication of direction and distance required for the vehicle 12 to move to align the vehicle 12 within the parking location 14, thereby aligning the capture resonator 24 with the source resonator 16. The controller 30 compares the thermal map to a thermal alignment target that corresponds to a reference thermal map of the location of the plurality of heat generating devices 20 when the vehicle 12 is properly aligned in the parking location 14. The thermal alignment target is stored within the memory device 32. The controller 30 then determines a thermal vector based on the comparison that indicates the direction and distance required to move the vehicle 12 in order to align the thermal map to the thermal alignment target. The controller 30 provides an alignment signal that is based on the thermal vector that is indicative of a movement required to align the vehicle 12 within the parking location 14. The display 34 then provides a graphic indication, based on the alignment signal, of the movement required by the vehicle 12 to align the vehicle 12 within the parking location 14.

Figure 4A:
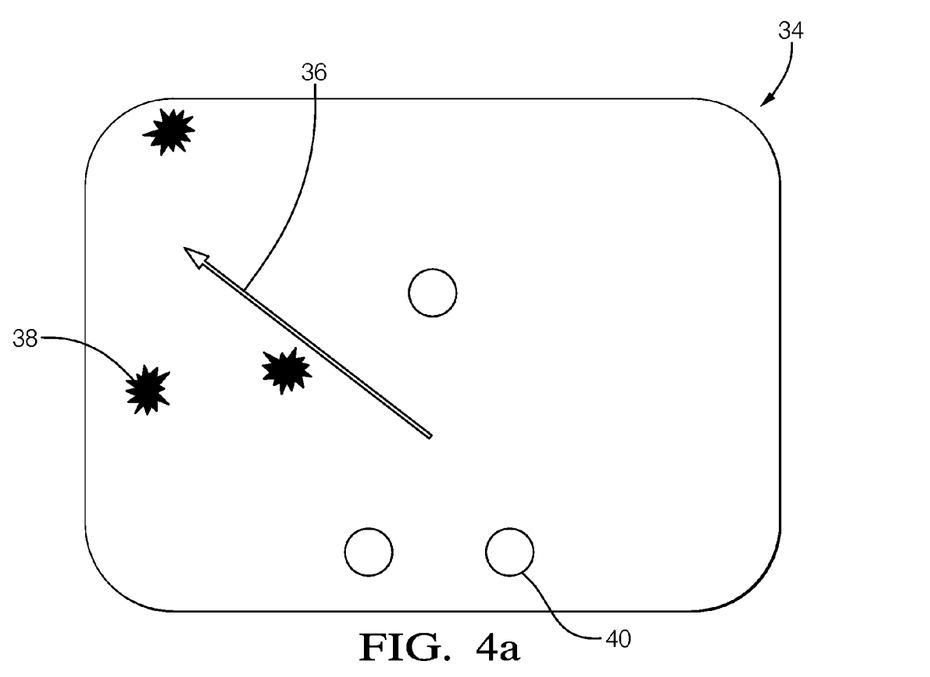
FIGS. 4a-4c are screen views of a display of the system of FIG. 1 as the vehicle is aligned in the parking location in accordance with one embodiment.
Figure 4B:
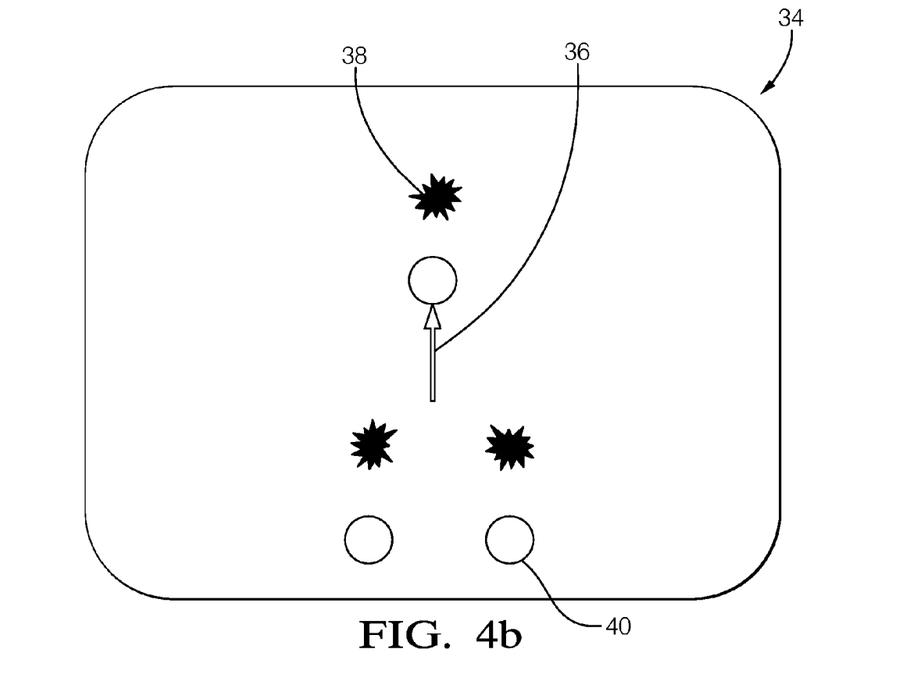
Figure 4C:
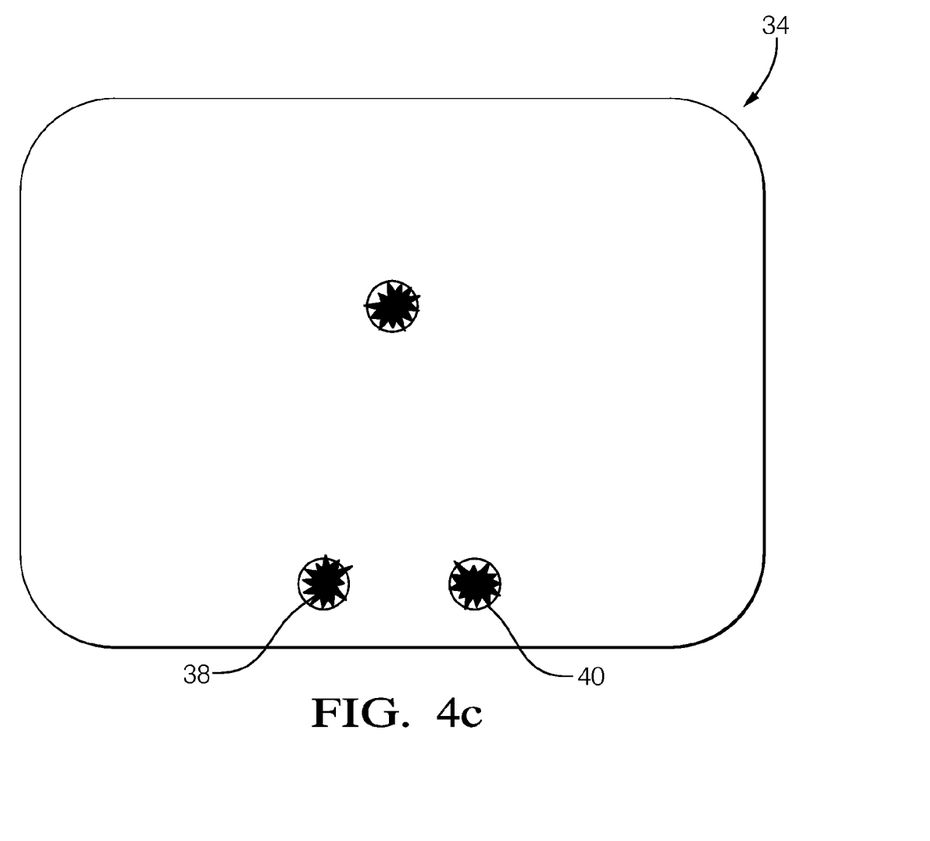

As illustrated in FIGS. 4a-4c, the display 34 shows an arrow 36 indicating the relative distance and direction between the thermal map and the thermal alignment target which corresponds to the distance and direction between the capture resonator 24 and the source resonator 16. The arrow 36 is based on the alignment signal generated by the controller 30. As shown in FIGS. 4a and 4b, the direction and length of the arrow 36 may change to correspond to the thermal vector indicating the misalignment between the thermal map and the thermal alignment target. Additionally or alternatively, the display 34 may show a graphic representation of the thermal map 38 of the heat generating devices 20 and a graphic representation of the thermal alignment target 40. As shown in FIG. 4c, the vehicle 12 is aligned within the parking location 14 when the thermal map 38 of the plurality of heat generating devices 20 and the thermal alignment target 40 are overlaid on the display 34, thereby aligning the source resonator 16 to the capture resonator 24.

As illustrated in FIG. 1, the display 34 may be located inside the vehicle 12 in a location visible to a vehicle operator, such as the vehicle center stack. The display 34 may be part of another display system, for example a vehicle navigation display. Alternatively, the display 34 may be located outside of the vehicle 12, perhaps in a location in front of the parking location 14 that is visible to the operator of the vehicle 12.

Figure 5:
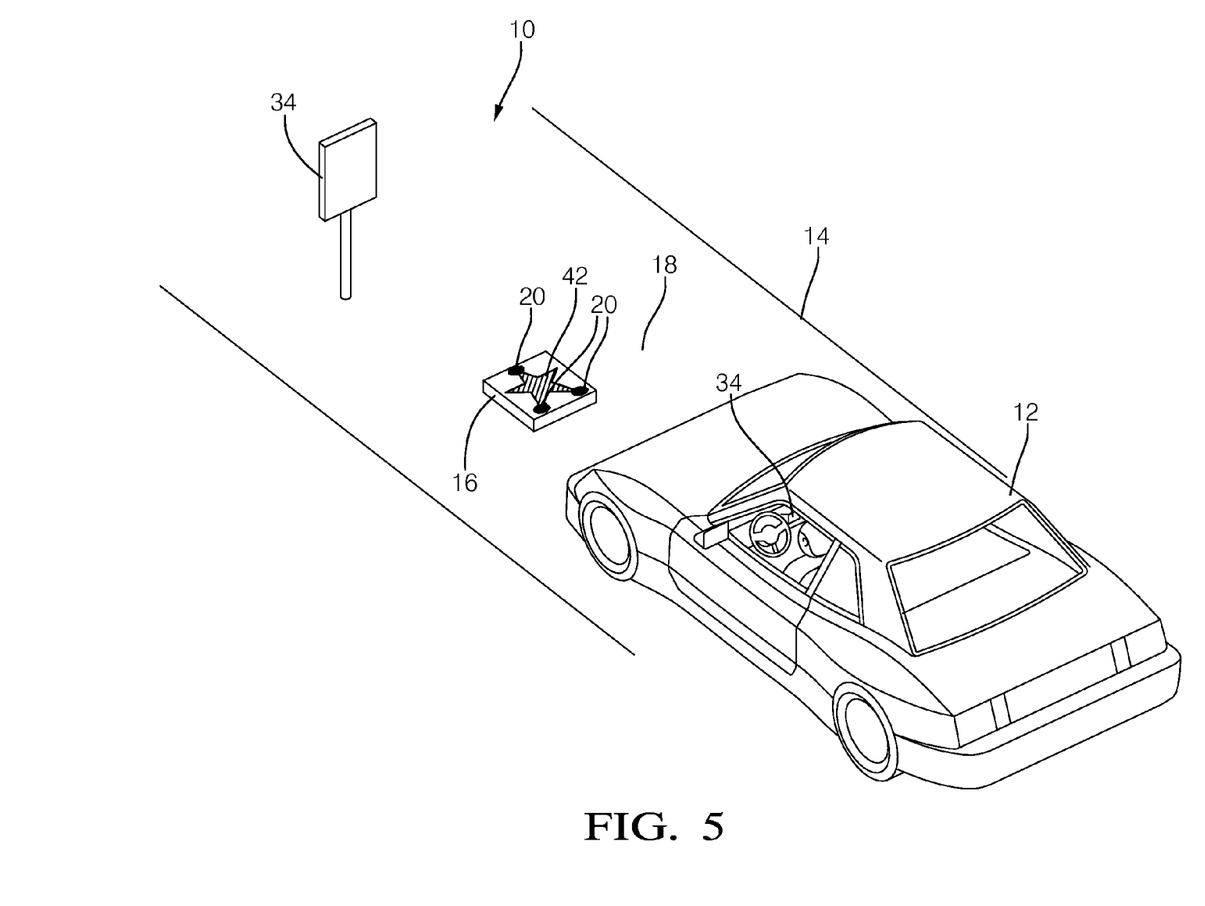
FIG. 5 is an overhead perspective view of a system for aligning a vehicle in a parking location in accordance with another embodiment.

As illustrated in FIG. 5, the source resonator 16 may also define a distinctive visual pattern 42. As several non-limiting examples, the distinctive visual pattern 42 may be a distinctive shape of the source resonator housing, a distinctive shape embossed into the source resonator 16 housing, or a shape printed or painted on the source resonator 16 housing. The distinctive visual pattern 42 is preferably an irregular polygon, such as an elongated five point star, so that there is a unique alignment between the vehicle 12 and the thermal pattern when the vehicle 12 is properly aligned within the parking location 14.

As illustrated in FIGS. 2 and 3, the system 10 may further include a visible light camera 44 in communication with the controller 30. The visible light camera 44 is mounted proximate to the capture resonator 24 so as to have a camera field of view 46 that includes the source resonator 16. The visible light camera 44 is configured to output digital light image data that is indicative of visible light intensity detected by pixels in the visible light camera 44. The controller 30 is configured to receive the light image data from the visible light camera 44 and determine a visual map forming an array of intensity data cells. The controller 30 compares the visual map to a visual alignment target that corresponds to a reference visual map of the distinctive visual pattern 42 when the vehicle 12 is properly aligned in the parking location 14 stored. The visual alignment target is stored within the memory device 32. The controller 30 then determines a visual vector based on the comparison that indicates the direction and distance required to move the vehicle 12 in order to align the visual map to the visual alignment target. The controller 30 provides an alignment signal that is based on the thermal vector and the visual vector that is indicative of a movement required to align the vehicle 12 within the parking location 14.

Figure 6A:
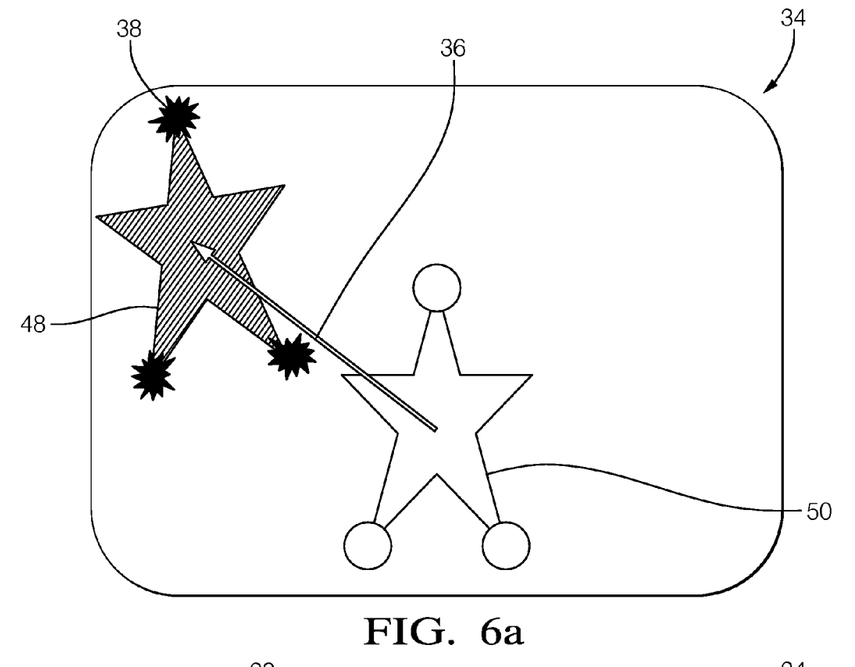
FIGS. 6a-6c are screen views of a display of the system of FIG. 5 as the vehicle is aligned in the parking location in accordance with another embodiment.
Figure 6B:
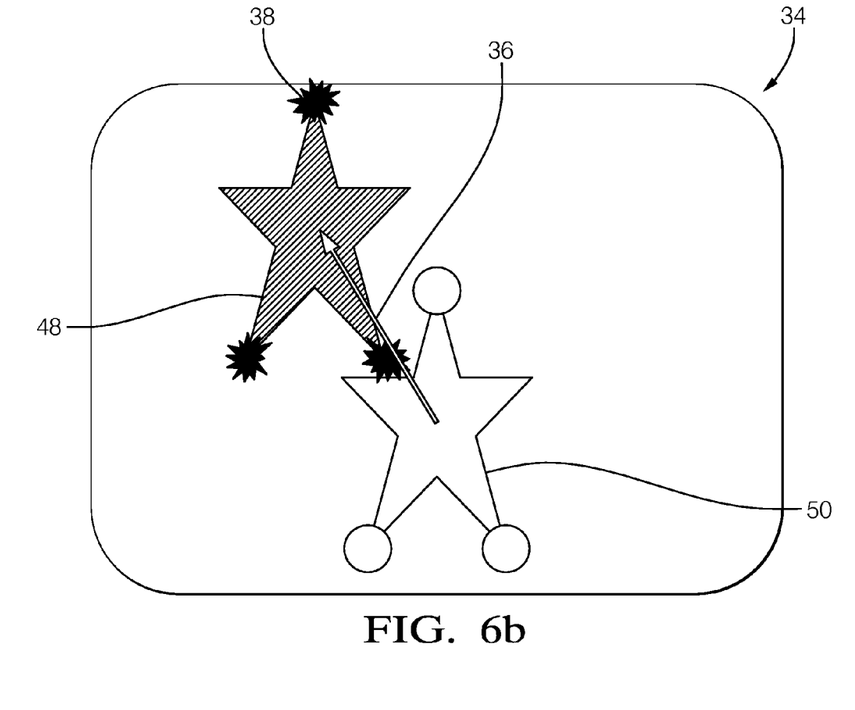
Figure 6C:
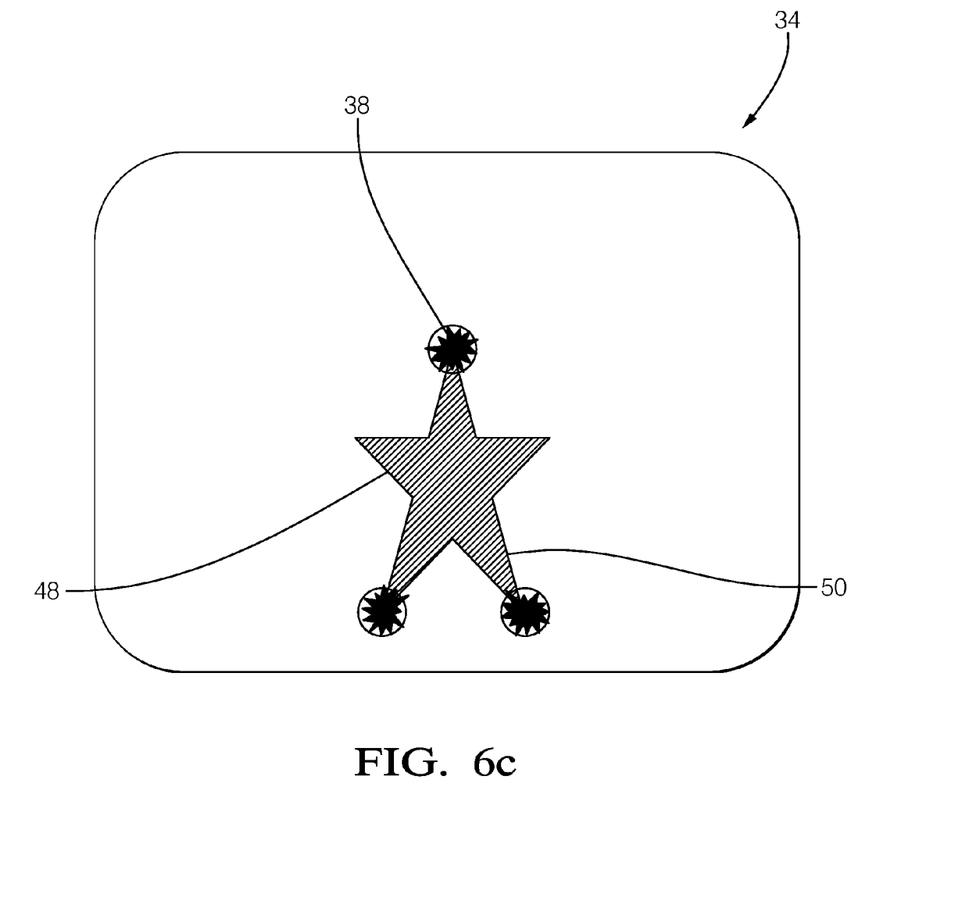

As illustrated in FIGS. 6a-6c, the arrow 36 indicates the relative distance and direction between the thermal map and the thermal alignment and a graphic representation of the thermal map 38 and the thermal alignment target 40. In addition, the display 34 provides a graphic indication of the visual map 48. As shown in FIG. 6c, the source resonator 16 and the capture resonator 24 are aligned when a visual map 48 of the distinctive visual pattern 42, the thermal map 38 of the plurality of heat generating devices 20, and a combined thermal and visual alignment target 50 are overlaid on the display 34.

Figure 7:
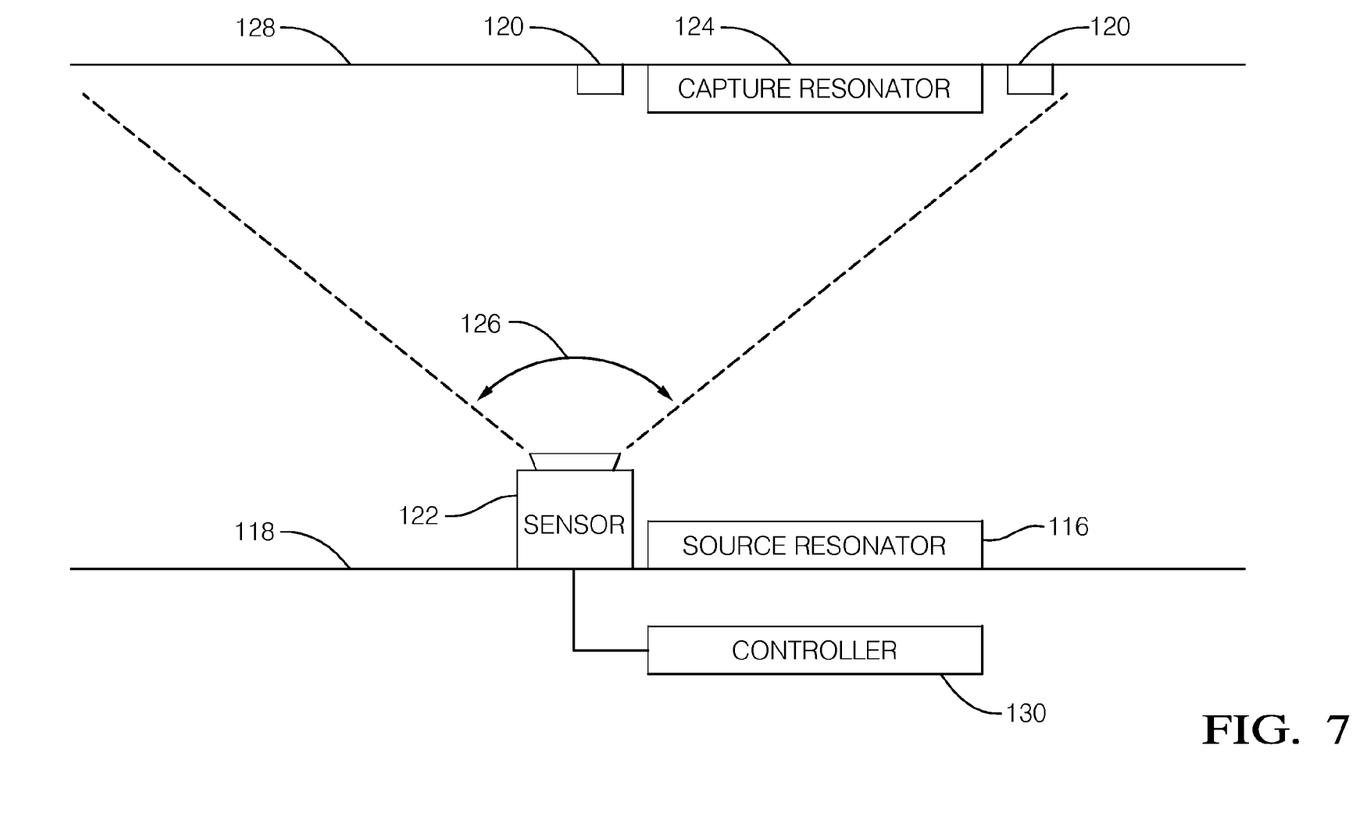
FIG. 7 is a system schematic diagram of a system for aligning a vehicle in a parking location in accordance with yet another embodiment.

Alternatively, as illustrated in FIG. 7, the multiple zone temperature sensor 122 is mounted proximate to the source resonator 116 so as to have the sensor field of view 126 that includes the capture resonator 124 and the plurality of heat generating devices 120 is disposed proximate to the capture resonator 124. The elements shown in FIG. 7 wherein the last two digits of the reference number correspond to the last two digits of the embodiment shown in FIG. 2 perform similar functions as in the embodiment of FIG. 2 described above.

While the embodiments illustrated are directed to a system 10 to align a vehicle 12 within a parking location 14 in order to align a source resonator 116 with a capture resonator 124 of a wireless power transfer system, the system 10 is not required to include a source resonator 116 or a capture resonator 124. This alignment system 10 using thermal targets is not limited to the illustrated application and may be applied to aligning a vehicle 12 within a parking location 14 of any other purpose.

Accordingly, a system for aligning a vehicle in a parking location is provided. The system uses a thermal target defined by a plurality of heat generating devices arranged in a distinctive pattern. The heat generating devices may be placed on, or embedded in, the surface of the parking location or incorporated into a resonator housing. The heat generating devices are detected by a multiple zone temperature sensor and a controller connected to the sensor determines a direction and distance that the vehicle needs to travel in order to align the vehicle within the parking location. The system includes a display to inform the vehicle's driver of the direction and distance needed to align the vehicle within the parking location.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

I claim:
1. A system to align a vehicle in a parking location, said system comprising:
a plurality of heat generating devices arranged in a surface of said parking location to produce a distinctive thermal pattern;
a multiple zone temperature sensor mounted so as to have a sensor field of view including said plurality of heat generating devices and configured to output thermal data indicative of a zone temperature for each of the zones;
a controller in communication with the multiple zone temperature sensor;
a memory device storing instructions that, when executed, cause said controller to receive the thermal data from said multiple zone temperature sensor and determine a thermal map of said plurality of heat generating devices forming an array of thermal data cells, wherein each thermal data cell has a temperature value based on a temperature characteristic of one or more of the zones; and
a display in communication with said controller, said display providing a graphic indication of the thermal map and a thermal alignment target;
wherein the system further includes a source resonator coupled to an electrical current source that causes the source resonator to emit a magnetic charging signal; and a capture resonator configured to wirelessly receive the magnetic charging signal and provide electrical current;
wherein the multiple zone temperature sensor is mounted so as to have the sensor field of view including said source resonator, wherein the plurality of heat generating devices are disposed proximate to the source resonator, and wherein said display provides the graphic indication of the thermal map and the thermal alignment target such that said source resonator and said capture resonator are aligned when the thermal map of the plurality of heat generating devices and the thermal alignment target are overlaid on the display.

2. The system according to claim 1, wherein said memory device contains additional instructions that, when executed, cause said controller to compare the thermal map to a reference thermal map of the plurality of heat generating devices, determine a thermal vector required to align the thermal map to the reference thermal map, and provide an alignment signal based on the thermal vector that is indicative of a movement required to align the vehicle within the parking location and wherein said display provides a graphic indication, based on the alignment signal, of the movement required by the vehicle to align the vehicle within the parking location.

3. The system according to claim 1, wherein said plurality of heat generating devices are infrared (IR) light emitting diodes (LEDs).

4. The system according to claim 1, wherein said plurality of heat generating devices are resistive heating elements.

5. The system according to claim 1, wherein said plurality of heat generating devices are disposed proximate to a source resonator of a wireless charging system.

6. The system according to claim 1, wherein said multiple zone temperature sensor is mounted on an underside of the vehicle.

7. The system according to claim 1, wherein said source resonator defines a distinctive visual pattern, wherein the system further includes a visible light camera in communication with said controller mounted so as to have a camera field of view that includes said source resonator and configured to output visible light image data indicative of visible light intensity detected by pixels in the visible light camera, and wherein said memory device contains additional instructions that, when executed, cause the controller to receive visible light image data from the visible light camera and determine an visual map characterized by an array of intensity data cells, wherein said display provides a graphic indication of the visual map such that the source resonator and the capture resonator are aligned when a visual map of the distinctive visual pattern, the thermal map of the plurality of heat generating devices, and the thermal alignment target are overlaid on the display.

8. The system according to claim 7, wherein said visible light camera is mounted proximate to said capture resonator.

9. The system according to claim 7, wherein said memory device contains additional instructions that, when executed, cause said controller to
compare the thermal map to a reference thermal map,
determine a thermal vector required to align the thermal map to the reference thermal map,
compare the visual map to a reference visual map,
determine a visual vector required to align the visual map to the reference visual map,
provide an alignment signal based on the thermal vector and the visual vector and indicative of a movement required to align the source resonator and the capture resonator,
and wherein said display provides a graphic indication of the movement required to align said capture resonator and said source resonator, based on the alignment signal.

10. The system according to claim 1, wherein said multiple zone temperature sensor is disposed proximate to the capture resonator.

11. The system according to claim 1, wherein said memory device contains additional instructions that, when executed, cause said controller to compare the thermal map to a reference thermal map of the plurality of heat generating devices, determine a thermal vector required to align the thermal map to the reference thermal map, and provide an alignment signal based on the thermal vector and indicative of a movement required to align the source resonator and the capture resonator.

12. The system according to claim 11, wherein said display provides a graphic indication of the movement required by the vehicle to align said capture resonator and said source resonator, based on the alignment signal.

13. The system according to claim 1, wherein the multiple zone temperature sensor is mounted so as to have the sensor field of view including said capture resonator, wherein the plurality of heat generating devices are disposed proximate to the capture resonator and wherein said display provides the graphic indication of the thermal map and the graphic indication of the thermal alignment target such that said source resonator and said capture resonator are aligned when the thermal map and the thermal alignment target are overlaid on the display.

14. The system according to claim 13, wherein said multiple zone temperature sensor is disposed proximate to the source resonator.

* * * * *